US009369486B2

(12) United States Patent
Lewis et al.

(10) Patent No.: US 9,369,486 B2
(45) Date of Patent: Jun. 14, 2016

(54) DEVICE AND METHOD FOR ENCODING INPUT DATA BASED ON HAMMING DISTANCE AND/OR WEIGHT

(71) Applicants: Matthew Lewis, Reutlingen (DE); Robert Szerwinski, Esslingen (DE); Jamshid Shokrollahi, Ludwigsburg (DE); Paulius Duplys, Markgroeningen (DE)

(72) Inventors: Matthew Lewis, Reutlingen (DE); Robert Szerwinski, Esslingen (DE); Jamshid Shokrollahi, Ludwigsburg (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/223,777

(22) Filed: Mar. 24, 2014

(65) Prior Publication Data

US 2014/0298458 A1  Oct. 2, 2014

(30) Foreign Application Priority Data

Mar. 28, 2013  (DE) .......................... 10 2013 205 544

(51) Int. Cl.
*H04L 29/06* (2006.01)
*H04L 9/00* (2006.01)

(52) U.S. Cl.
CPC ............ *H04L 63/1475* (2013.01); *H04L 9/003* (2013.01)

(58) Field of Classification Search
CPC .... H04L 1/0041; H04L 25/4915; G06F 11/10
USPC .......................................................... 726/22
See application file for complete search history.

(56) References Cited

U.S. PATENT DOCUMENTS

| 6,456,208 | B1 * | 9/2002 | Nazari | ................. | H03M 5/145 |
| | | | | | 341/59 |
| 2007/0076864 | A1 * | 4/2007 | Hwang | ..................... | G06F 7/00 |
| | | | | | 380/29 |
| 2007/0172053 | A1 * | 7/2007 | Poirier | ................ | G06F 12/1408 |
| | | | | | 380/28 |

* cited by examiner

*Primary Examiner* — Jason K Gee
(74) *Attorney, Agent, or Firm* — Norton Rose Fulbright US LLP

(57) ABSTRACT

An electronic device for processing data includes: an input interface for receiving input data; a processing module for processing data; and an encoding unit configured to encode data words received at the input interface as input data, in order to obtain encoded data words. The encoding unit is configured to encode the data words in such a manner that a specified proportion of all encoded data words have a specified Hamming distance and/or a specified Hamming weight. The processing module is configured to process the encoded data words.

35 Claims, 4 Drawing Sheets

| S1 | S2 | S3 |
|---|---|---|
| 1 | (0, 0, 0, 0) | (0, 0, 0, 0, 0, 1, 1) |
| 2 | (0, 0, 0, 1) | (0, 0, 0, 1, 0, 0, 1) |
| 3 | (0, 0, 1, 0) | (0, 0, 1, 0, 0, 0, 1) |
| 4 | (0, 0, 1, 1) | (0, 0, 1, 1, 0, 0, 0) |
| 5 | (0, 1, 0, 0) | (0, 1, 0, 0, 0, 0, 1) |
| 6 | (0, 1, 0, 1) | (0, 1, 0, 1, 0, 0, 0) |
| 7 | (0, 1, 1, 0) | (0, 1, 1, 0, 0, 0, 0) |
| 8 | (0, 1, 1, 1) | (1, 0, 0, 0, 1, 0, 0) |
| 9 | (1, 0, 0, 0) | (1, 0, 0, 0, 0, 0, 1) |
| 10 | (1, 0, 0, 1) | (1, 0, 0, 1, 0, 0, 0) |
| 11 | (1, 0, 1, 0) | (1, 0, 1, 0, 0, 0, 0) |
| 12 | (1, 0, 1, 1) | (0, 1, 0, 0, 1, 0, 0) |
| 13 | (1, 1, 0, 0) | (1, 1, 0, 0, 0, 0, 0) |
| 14 | (1, 1, 0, 1) | (0, 0, 1, 0, 1, 0, 0) |
| 15 | (1, 1, 1, 0) | (0, 0, 0, 1, 1, 0, 0) |
| 16 | (1, 1, 1, 1) | (0, 0, 0, 0, 1, 1, 0) |

| S1 | S2 | S3 |
|---|---|---|
| 1 | (0, 0, 0, 0) | (0, 0, 0, 0, *0, 1, 1*) |
| 2 | (0, 0, 0, 1) | (0, 0, 0, 1, *0, 0, 1*) |
| 3 | (0, 0, 1, 0) | (0, 0, 1, 0, *0, 0, 1*) |
| 4 | (0, 0, 1, 1) | (0, 0, 1, 1, *0, 0, 0*) |
| 5 | (0, 1, 0, 0) | (0, 1, 0, 0, *0, 0, 1*) |
| 6 | (0, 1, 0, 1) | (0, 1, 0, 1, *0, 0, 0*) |
| 7 | (0, 1, 1, 0) | (0, 1, 1, 0, *0, 0, 0*) |
| 8 | (0, 1, 1, 1) | (1, 0, 0, 0, *1, 0, 0*) |
| 9 | (1, 0, 0, 0) | (1, 0, 0, 0, *0, 0, 1*) |
| 10 | (1, 0, 0, 1) | (1, 0, 0, 1, *0, 0, 0*) |
| 11 | (1, 0, 1, 0) | (1, 0, 1, 0, *0, 0, 0*) |
| 12 | (1, 0, 1, 1) | (0, 1, 0, 0, *1, 0, 0*) |
| 13 | (1, 1, 0, 0) | (1, 1, 0, 0, *0, 0, 0*) |
| 14 | (1, 1, 0, 1) | (0, 0, 1, 0, *1, 0, 0*) |
| 15 | (1, 1, 1, 0) | (0, 0, 0, 1, *1, 0, 0*) |
| 16 | (1, 1, 1, 1) | (0, 0, 0, 0, *1, 1, 0*) |

Fig. 5

DEVICE AND METHOD FOR ENCODING INPUT DATA BASED ON HAMMING DISTANCE AND/OR WEIGHT

BACKGROUND OF THE INVENTION

The present invention relates to a device for processing data, the device having an input interface for receiving input data and a processing module for processing data. The present invention further relates to a method for operating such a device.

BRIEF SUMMARY OF THE INVENTION

An object of the present invention is to improve a device and a method of the type mentioned at the outset, in order to provide increased security from attacks, in particular, side channel attacks.

In the case of the device of the type mentioned at the outset, this object of the present invention is achieved by providing an encoding unit, which is configured to encode data words received at the input interface as input data, in order to obtain encoded data words; the encoding unit being configured to encode the data words in such a manner, that a specifiable proportion of all encoded data words among themselves, preferably at least approximately 50% of all encoded data words, have a specifiable Hamming distance and/or a specifiable Hamming weight; and the object of the present invention is achieved by configuring the processing module to process the encoded data words.

According to the present invention, it has been recognized that the transformation of the data words obtained on the input side, using the proposed encoding, which determines the criteria regarding Hamming distance or Hamming weight, results in a lower leakage of information regarding the processed data inside the processing module of the present invention.

In this case, "all encoded data words" is understood to be the amount of all encoded data words theoretically occurring. If, for example, j data words obtained on the input side are present, these j data words obtained on the input side may be correspondingly assigned j encoded data words by the encoding unit. Accordingly, in one specific embodiment, the encoding is preferably carried out in such a manner, that at least approximately 50% of the j encoded data words have, among themselves, a specifiable Hamming distance. Alternatively, or in addition, the encoding may preferably be carried out in such a manner, that at least approximately 50% of the j encoded data words have a specifiable Hamming weight.

By this means, in particular, so-called differential power analysis (DPA) attacks on the device of the present invention may be prevented or rendered considerably more difficult. For example, in a preferred specific embodiment, it is provided that the specifiable proportion be approximately 100%. This means that all of the (j) data words are encoded in such a manner, that they have, among themselves, a specifiable Hamming distance and/or a specifiable Hamming weight. In this case, e.g., using a differential power analysis (DPA) attack, only an extremely low information portion or no important information portion at all may be obtained by correspondingly analyzing the operation of the device of the present invention, since, e.g., in the case of a constant Hamming weight of all encoded data words, each data word has as many bits with the value of 1 as all of the other data words. In this manner, bit transitions (state transitions from 1 to 0 and vice versa), as occur during the processing of the encoded data words, are prevented from releasing information about the actual information content of the unencoded data words.

In one advantageous specific embodiment, it is provided that the processing module have at least one register, which is configured to store at least one encoded data word at least temporarily. This means that a simple specific embodiment of the present invention relates to a device, which has an input interface and an encoding unit of the present invention, and in which the processing of the present invention provides, e.g., at least temporary storage in the register. Thus, in this specific embodiment, a data word (or also a plurality of data words) encoded according to the present invention is stored at least temporarily in a register or another memory, namely, in the encoded form, so that the encoded data words may be subsequently fetched out and processed further. For example, a subsequent cryptographic method may read out the corresponding register and process the data further.

Alternatively, or in addition, the processing module of the present invention may also include at least one cryptographic unit, which is configured to execute at least a portion of a cryptographic method. For example, the processing module may have a cryptographic unit, which is configured to execute the complete AES (advanced encryption standard) algorithm.

In one further specific embodiment, it may be provided that the processing module have a cryptographic unit, which is configured to execute a portion of a cryptographic method, e.g., to execute a nonlinear substitution operation, as is also the object of the so-called SubBytes( ) function of the AES Cryptography Standard (c.f. http://csrc.nist.gov/publications/fips/fips197/fips-197.pdf, chapter 5.1.1).

In one further advantageous variant, it is provided that the encoding unit be configured to encode the data words by adding a specifiable number of bits to each data word. In this connection, the value of the correspondingly added bits may be selected as a function of the encoding of the present invention. In other words, the present invention's addition of a specifiable number of bits (and selection of their respective value) provides a number of degrees of freedom for the encoding of the present invention, which allows a desired Hamming weight and/or desired Hamming distance to be set for one or more encoded data words. The actual information of the unencoded data words is not lost in the process, since according to the present invention, only new bits are added.

In a further advantageous specific embodiment, it is provided that the encoding unit be configured to select the specifiable number of added bits or their values in such a manner, that the specifiable proportion of all of the encoded data words among themselves have the specifiable Hamming distance and/or the specifiable Hamming weight.

The number of different digit positions of two code words compared to each other is referred to as Hamming distance. Therefore, in the case of a binary code and two corresponding code words, the Hamming distance corresponds to the number of different bit positions of the compared code words.

The Hamming weight is understood to be the Hamming distance from the zero vector. Accordingly, in the case of a binary code, the Hamming weight corresponds to the number of digit positions of the code word in question that are different from zero, that is, the number of bits having the value of one.

In a further advantageous specific embodiment, it is provided that the encoding unit be configured to assign the data words listed in column S2 of the following table the encoded data word listed in the corresponding line of column S3 of the table. In each instance, individual bit positions of the data words are separated from one another by commas, and a data word is set in parentheses ( ).

| S2 | S3 |
|---|---|
| (0, 0, 0, 0) | (0, 0, 0, 0, 1, 1) |
| (0, 0, 0, 1) | (0, 0, 0, 1, 0, 0, 1) |
| (0, 0, 1, 0) | (0, 0, 1, 0, 0, 0, 1) |
| (0, 0, 1, 1) | (0, 0, 1, 1, 0, 0, 0) |
| (0, 1, 0, 0) | (0, 1, 0, 0, 0, 0, 1) |
| (0, 1, 0, 1) | (0, 1, 0, 1, 0, 0, 0) |
| (0, 1, 1, 0) | (0, 1, 1, 0, 0, 0, 0) |
| (0, 1, 1, 1) | (1, 0, 0, 0, 1, 0, 0) |
| (1, 0, 0, 0) | (1, 0, 0, 0, 0, 0, 1) |
| (1, 0, 0, 1) | (1, 0, 0, 1, 0, 0, 0) |
| (1, 0, 1, 0) | (1, 0, 1, 0, 0, 0, 0) |
| (1, 0, 1, 1) | (0, 1, 0, 0, 1, 0, 0) |
| (1, 1, 0, 0) | (1, 1, 0, 0, 0, 0, 0) |
| (1, 1, 0, 1) | (0, 0, 1, 0, 1, 0, 0) |
| (1, 1, 1, 0) | (0, 0, 0, 1, 1, 0, 0) |
| (1, 1, 1, 1) | (0, 0, 0, 0, 1, 1, 0) |

In one further advantageous specific embodiment, at least part of the device takes the form of an integrated circuit (IC) preferably implemented using CMOS (complementary metal oxide semiconductor) technology. The functionality of the present invention may also be implemented in an ASIC or FPGA.

BRIEF DESCRIPTION OF THE DRAWINGS

FIG. 5 shows a schematic of a table for illustrating encoding according to one specific embodiment.

DETAILED DESCRIPTION OF THE INVENTION

Figure 1:
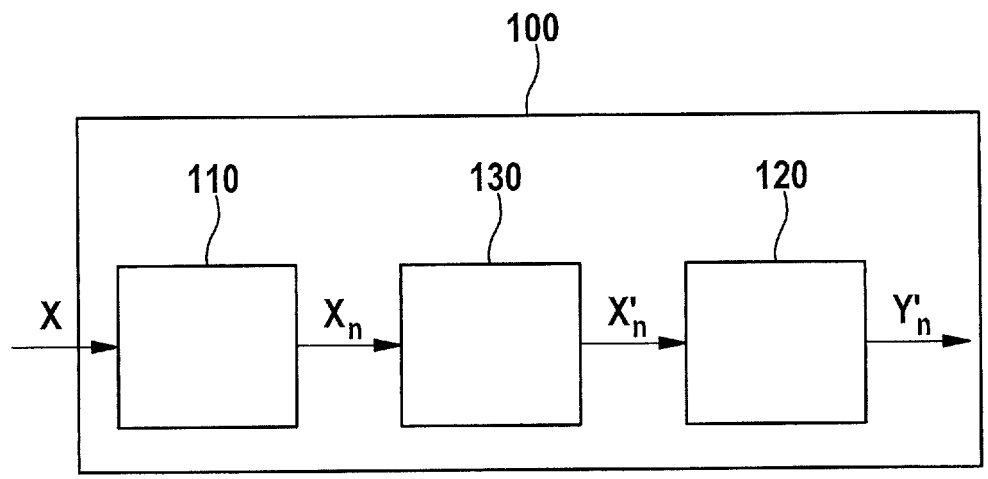
FIG. 1 shows a schematic of a specific embodiment of a device according to the present invention.

FIG. 1 schematically shows a specific embodiment of a device 100 according to the present invention for processing data. Device 100 has an input interface 110 for receiving input data X. Input data X may be present, for example, in the form of temporally consecutive, digital data words, e.g., data words Xn having a word length of, e.g., four bits. Other word lengths are possible, as well. Accordingly, input interface 110 directs input data X to its output in the form of data words Xn.

Device 100 further includes a processing module 120 for processing data, e.g., data which have been derived from input data X.

The present invention also provides an encoding unit 130, which is configured to encode the data words Xn received at input interface 110 as input data X, in order to obtain encoded data words Xn'. As is apparent from FIG. 1, encoded data words Xn' are outputted at the output of encoding unit 130 and supplied to processing module 120 for processing. Correspondingly, processing module 120 outputs processed, encoded data words Yn' at its output.

According to the present invention, encoding unit 130 is configured to encode data words Xn in such a manner, that a specifiable proportion of all encoded data words Xn' among themselves, preferably at least approximately 50% of all encoded data words Xn', have a specifiable Hamming distance and/or a specifiable Hamming weight. In this manner, subsequent processing of encoded data words Xn' and/or storage and/or access to them in processing module 120 advantageously causes a lower degree of leakage of information related to data X, which means that DPA attacks on device 100 are rendered markedly more difficult.

Therefore, according to the present invention, processing module 120 processes encoded data words Xn', and does not directly process unencoded input data X or corresponding data words Xn.

In another preferred specific embodiment, encoding unit 130 is configured to encode data words Xn in such a manner, that all of the encoded data words have, among themselves, the specifiable Hamming distance.

Alternatively, or in addition, it may be provided that the encoding be carried out in such a manner, that all encoded data words Xn' have a specifiable Hamming weight.

Other variants of the encoding by encoding unit 130 are also conceivable. This means that the present invention is not limited to encoding input data words Xn with the objective of obtaining the specifiable Hamming distance or the specifiable Hamming weight.

Figure 2A:
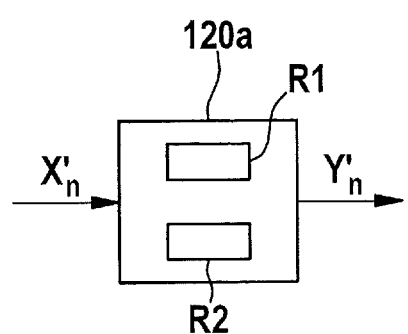
FIGS. 2a and 2b show, in each instance, a schematic of a specific embodiment of a processing module according to the present invention.

According to a preferred specific embodiment, processing module 120 may be, e.g., a register. FIG. 2a shows a further specific embodiment, in which a variant 120a of processing module 120 shown in FIG. 1 is illustrated. Processing module 120a has two registers R1, R2, which are configured to at least temporarily store encoded data words Xn' supplied to them on the input side, as are obtained from encoding unit 130. At a given time, processing module 120a outputs the encoded data words, which are stored in registers R1, R2, as "processed" encoded data Yn', via an output, for further processing. In the present case, since processing module 120a is formed as a pure storage device, there is the special feature that output data words Yn' of module 120a correspond to input data words Xn'.

Figure 2B:
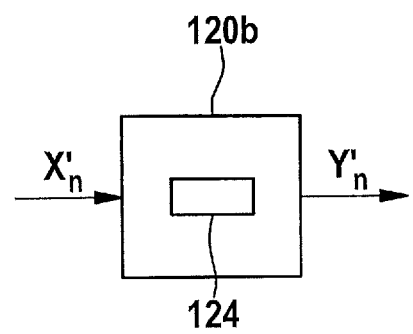

FIG. 2b shows a further specific embodiment 120b of a processing module according to the present invention. Processing unit 120b presently has a cryptographic unit 124, which may be, e.g., a unit for executing a portion of an algorithm of an encryption method. For example, cryptographic unit 124 may be configured to carry out a nonlinear substitution operation with the input data Xn' supplied to it, and to obtain corresponding output data Yn'. Such a nonlinear substitution operation is provided, for example, in the so-called SubBytes( ) function of the AES (advanced encryption standard). Accordingly, a variant of the present invention according to FIG. 2b may be used for executing the relevant portions of the AES algorithm.

In a further specific embodiment, the processing module may be a data bus (serial or parallel), or in general, a circuit component, to which encoded data words may be supplied.

In a further specific embodiment, components 120 and 130 may also be functionally combined with one another.

Figure 3A:
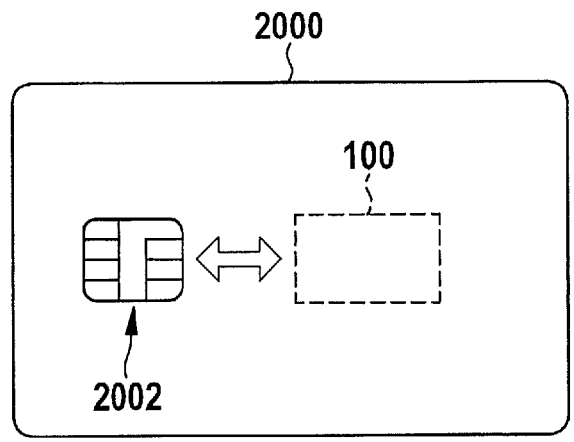
FIGS. 3a and 3b show schematics of units including a device according to the present invention.

FIG. 3a shows a further field of application of the present invention. A chip card 2000 is illustrated, on which a device 100 of the present invention is situated. Device 100 is in data communication with interface media 2002, via which chip card 2000 or the device 100 contained in it may exchange data, in a manner known per se, with external devices such as a chip card reader (not shown) or the like. The device 100 of FIG. 3a advantageously has at least the structure illustrated in FIG. 1. In addition, it is conceivable for a plurality of encoding units 130 or a plurality of identical or different processing modules 120 to be provided within a device 100, which means that corresponding method steps of a data processing method implemented in device 100 may make use of the advantages of the present invention.

Figure 3B:
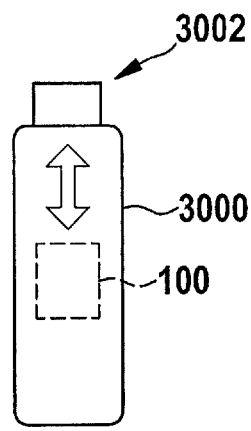

FIG. 3b shows a further application of the present invention. A USB (universal serial bus) data storage medium 3000, which includes a device of the present invention 100 and a USB connecting means 3002, is illustrated.

Figure 4:
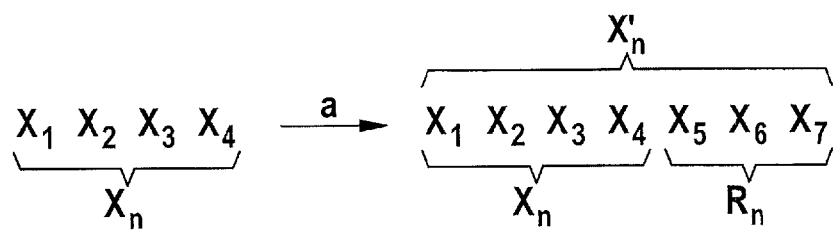
FIG. 4 shows a schematic of an example for a specific embodiment of encoding according to the present invention.

FIG. 4 shows an example of encoding according to the present invention, in light of a data word Xn including four bits (corresponds to a nibble, i.e., half-byte). In FIG. 4, a first bit of data word Xn is denoted by reference character X1, a second bit is denoted by reference character X2, a third bit is denoted by reference character X3, and a fourth bit is denoted by reference character X4. Accordingly, the following notation is also suitable for representing data word Xn: (x1, x2, x3, x4), which corresponds to the side-by-side arrangement of individual bits x1, x2, x3, x4 of data word Xn.

Using encoding by encoding unit 130 (FIG. 1), data word Xn of FIG. 4 is converted to an encoded data word Xn', cf. arrow a from FIG. 4. As is apparent from FIG. 4, encoded data word Xn' still has the four bits x1, x2, x3, x4 of original data word Xn, as well as three additional bits x5, x6, x7. Thus, in the present case, encoding a is accomplished by appending a bit sequence Rn, which presently has a length of three bits.

The values of individual bits x5, x6, x7 of the bit sequence Rn appended within the scope of the encoding of the present invention may advantageously be selected, for example, such that a desired Hamming distance of encoded data word Xn' from other encoded data words or a desired Hamming weight of encoded data word Xn' is obtained.

FIG. 5 exemplarily shows an encoding table having three columns S1, S2, S3, as may be used, for example, in the encoding unit 130 (FIG. 1) according to a specific embodiment. Column S1 includes the line numbers of the total of 16 lines of the table from FIG. 5. Second column S2 includes input data words Xn, which have four bits, in the notation already described above, in which the individual bit positions are each separated by commas and the data word is set in parentheses. Column S3 of the table illustrated in FIG. 5 includes encoded data words Xn', as are assigned by encoding unit 130 of the present invention (FIG. 1) to respective data words Xn of column S2 of the same line.

The table according to FIG. 5 may be obtained from the sixteen data words Xn, for example, using the following equations or formation rule:

$$Xj'=(x1,x2,x3,x4,0,0,[1-HW(x\|1)]), \text{if } HW(Xj) \leq 2", \text{ and}$$

$$Xj'=(\overline{x1,x2,x3,x4},1,[2-HW(x\|1)],[1-HW(x\|1)]), \text{if } HW(Xj)>2",$$

where HW(.) indicates the Hamming weight of a data word, ‖ indicates concatenation by the bit, Xj is the jth unencoded data word, and Xj' is the jth encoded data word.

The encoding of the present invention illustrated by the table of FIG. 5 advantageously has the effect, that all of the encoded data words (elements of column S3 of the table) have a constant Hamming weight, which means that DPA attacks on device 100 are rendered more difficult, since, in the scope of the processing in processing module 120 of the data words Xn' encoded according to the present invention (FIG. 1), the same number of state changes of the individual bits of encoded data words Xn' occur for each code word, so that special combinations of state changes may not be directly associated with special code words, which are presently being processed by module 120.

To achieve an 8-bit implementation based on the principle of the present invention, the steps explained above and the encoding of the table according to FIG. 5 may each be applied to two half-bytes ("nibble"), which correspond to an 8-bit data word. Consequently, an 8-bit implementation of the SubBytes( ) function of the AES may realized, for example. The design approach of the present invention may also be scaled highly effectively, so that for a 32-bit implementation, for example, a 32-bit-wide data word is initially broken down into eight half-bytes, preferably within a clock cycle, thus, concurrently, and then the eight half-bytes obtained from this may be encoded according to the present invention.

Figure 6:
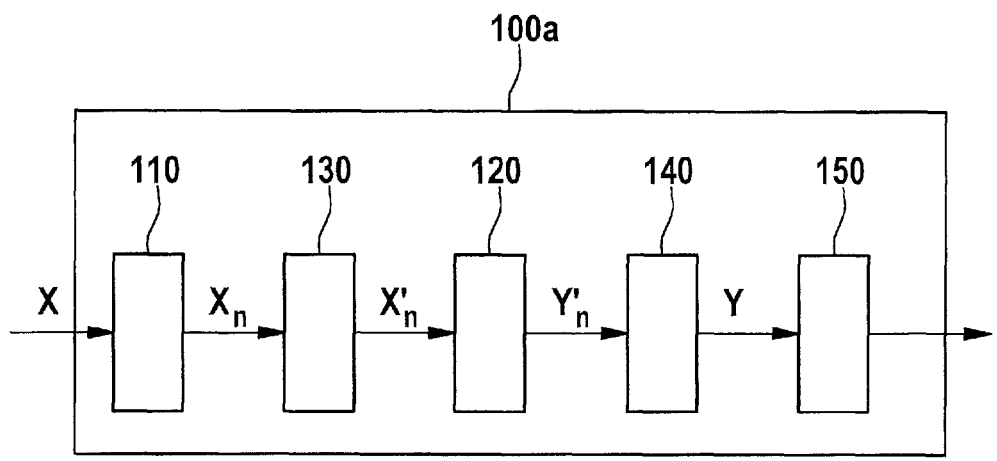
FIG. 6 shows a schematic of a further device according to one specific embodiment.

FIG. 6 shows a further specific embodiment of the present invention, in which a device 100a for processing data is illustrated. On the input side, device 100a again receives input data X, which are passed on through input interface 110 to subsequent encoding unit 130, for example, in the form of, e.g., input data words Xn containing 4 bits. Encoding unit 130 carries out encoding, by which encoded input data Xn' are obtained. Encoded input data words Xn' are processed in subsequent processing module 120, so that processed, encoded data words Yn' are obtained at the output of processing unit 120. Data words Yn' are then decoded by unit 140, which constitutes a decoding unit, so that decoded, processed data words Y are obtained, which may be outputted via output interface 150 to further units outside of device 100.

In another specific embodiment, components 120 and 140 of FIG. 6 may also be functionally combined with one another.

In general, the principle of the present invention is not limited to encoding in such a manner, that the encoded data words have, as described above, a specifiable Hamming distance and/or a specifiable Hamming weight. On the contrary, according to further specific embodiments, encoding unit 130 (FIG. 1, FIG. 6) may also be alternatively configured in such a manner, that it transforms input data words Xn into encoded data words Xn', using a so-called leakage preserving code. In general, the use of the leakage preserving code has the advantage that data words encoded in such a manner minimize a leakage of information, which is ascertainable, for example, via physically observable or measurable variables (e.g., measurement of electromagnetic fields, measurement of the electrical energy consumption of device 100 or of module 120), via the data processed in module 120.

Figure 7:
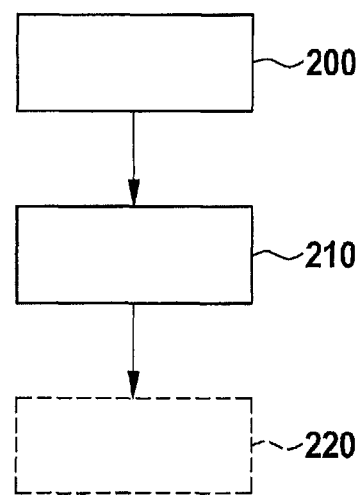
FIG. 7 shows a schematic of a simplified flow chart of a variant of the method according to the present invention.

FIG. 7 schematically shows a flow chart of a specific embodiment of the method according to the present invention. In step 200, one or more input data words Xn are encoded by encoding unit 130 (FIG. 1). In step 210, encoded data words Xn' obtained in step 200 are processed by processing module 120. Optionally, in step 220, processed data words Yn' are subsequently decoded.

The principle of the present invention of providing encoded data words Xn', which are subjected to further processing, instead of processing unencoded data words Xn, produces the advantage that no randomly-based processes or pseudo-random processes are necessary for the DPA hardening (hardening of device 100 with respect to DPA attacks), which means that the degree of complexity is reduced in comparison with known methods. In addition, device 100 of the present invention may be implemented, for example, using conventional CMOS cells; the device 100, as such, being able to be provided in the form of a monolithic integrated circuit or also as a circuit component, which may be integrated into further circuit modules. One further advantage of the present invention is that the proper functioning of device 100 is relatively simple to test, since the present invention is not based on the use of random numbers or pseudo-random numbers.

In addition, device 100 may be implemented on a relatively small chip surface. Since the measures of the present invention, which produce hardening with respect to DPA attacks, are taken on the architecture level, it is possible to easily reuse them in different chip designs, or in general, in designs of devices that are intended to utilize the functionality of the present invention.

The present invention may be implemented advantageously in both hardware and software, or in a combination of the two.

In general, by providing encoding unit 130 (FIG. 1), the principle of the present invention renders possible a transformation of input data Xn into encoded data Xn', which constitute a so-called leakage preserving code that is less susceptible to DPA attacks. In other words, the code including encoded data words Xn' scarcely exhibits leakage in the cryptographic sense. This is synonymous to the statement that only little or no side channel information is contained in the encoded data words.

Therefore, using measures known per se, such as measuring electromagnetic emissions of device 100 or measuring its electrical energy consumption or the like, an attacker of device 100 of the present invention may obtain relatively little or no information at all about the data processed in module 120.

As already mentioned above, processing module 120 may execute, e.g., a portion of a cryptographic method or algorithm, or also a complete cryptographic method, e.g., encryption or decryption, e.g., in accordance with the AES cryptography standard.

In this manner, simple scalability of the principle of the present invention is provided.

In order to reduce costs, in the case of a further specific embodiment, the measure of the present invention, including components 110, 120, 130, may be provided, e.g., only for especially security-related processing units of a cryptographic algorithm. Alternatively, all of the processing steps of a device processing data may also be hardened, using the principle of the present invention.

In comparison with conventional countermeasures against side channel attacks, the countermeasures proposed by the present invention, which are based on encoding, have various advantages:

1. Countermeasures based on encoding are of a deterministic nature, which means that they require relatively low computing expenditure and do not require, in particular, the provision of random number generators or pseudo-random number generators.

2. One implementation as an integrated circuit utilizing conventional CMOS cells is easily possible.

3. Due to the independence from random numbers, a test of device 100 of the present invention is, by far, simpler than tests of devices and methods, which are based on the use of random numbers.

4. For implementation, the countermeasures based on the method of the present invention require only relatively little chip surface and few complex codes that must be produced by encoding unit 130.

5. The principle of the present invention may advantageously be applied either to individual components of a device to be protected, or to the entire device.

6. The present invention may be used in a modular manner. For example, a DPA-hardened memory register in the form of device 100 of the present invention may be provided, when processing module 120 takes the form of, e.g., a simple, i.e., conventional memory register R1. In this case, configuration 100 according to FIG. 1 may be provided modularly and also used in greater quantity in a device to be protected.

The measures of the present invention based on encoding eliminate or reduce, to a large extent, the leakage of information through side channels.

In one further advantageous specific embodiment, it may be provided that the code be formed in such a manner, that partial or complete error correction of encoded data words, which are corrupted, e.g., in the course of a so-called fault attack, is possible. This may be accomplished, for example, by adding further bits, which effect an increase in redundancy.

In a further advantageous specific embodiment, it may be provided that processing module 120 be configured to check one or more encoded data words Xn' with a view to whether they are valid data words in the sense of the code used by the encoding unit. In the case of the configuration of FIG. 6, apart from module 120, such a test may also be conducted in unit 140. For example, in the case of encoding by encoding unit 130, the object of which is a constant Hamming weight (e.g., all of encoded data words Xn' have a constant Hamming weight), processing module 120 may check if an encoded data word Xn' supplied to it actually has the Hamming weight in question. If not, it may be concluded that, e.g., a so-called fault injection attack is being carried out on device 100, in the scope of which false code words are deliberately injected by an attacker, e.g., into the connection between components 130 and 120, in order to allow a more efficient DPA attack. The present invention's check of encoded data words Xn', e.g., in module 120 or 160, may prevent this. In one advantageous specific embodiment, the test described above may be conducted, for example, using a so-called membership test for encoded data words.

What is claimed is:

1. A device for processing data to alter corresponding electronic signals to reduce susceptibility of the device to hacking of its data, the device comprising:
   an input interface for receiving input data words; and
   processing circuitry including hardware programmed, via a hardwired configuration or with software, wherein the programming causes the processing circuitry, when the processing circuitry is in operation, to respond to the input of the data words by executing an algorithm by which execution the input data words are encoded into respective encoded versions of the input data words, wherein the algorithm is defined for application to a set of possible different data words receivable as input data at the input interface, and the algorithm defines that the encoding of the received input data words is performed according to a condition that, when the input data words that are encoded by the execution of the algorithm include all of the set of possible different data words, at least one of:
   for at least 50% of all pairwise combinations of the encoded versions of the set of all of the possible data words, Hamming distances between the respective words of the respective pairwise combinations are the same as each other; and
   a Hamming weight of at least 50% of all of the encoded versions of the set of all of the possible data words is the same is the same as each other.

2. The device as recited in claim 1, further comprising a register which is configured to store at least one of the encoded versions.

3. The device as recited in claim 2, wherein the data encoding includes adding a specified number of bits to each data word received as input data at the input interface.

4. The device as recited in claim 1, wherein the algorithm provides for assignment to the data words listed in column S2 of the following table the respective encoded data words listed in the corresponding line of column S3 of the table:

| S2 | S3 |
| --- | --- |
| (0, 0, 0, 0) | (0, 0, 0, 0, 0, 1, 1) |
| (0, 0, 0, 1) | (0, 0, 0, 1, 0, 0, 1) |
| (0, 0, 1, 0) | (0, 0, 1, 0, 0, 0, 1) |
| (0, 0, 1, 1) | (0, 0, 1, 1, 0, 0, 0) |
| (0, 1, 0, 0) | (0, 1, 0, 0, 0, 0, 1) |
| (0, 1, 0, 1) | (0, 1, 0, 1, 0, 0, 0) |
| (0, 1, 1, 0) | (0, 1, 1, 0, 0, 0, 0) |
| (0, 1, 1, 1) | (1, 0, 0, 0, 1, 0, 0) |
| (1, 0, 0, 0) | (1, 0, 0, 0, 0, 0, 1) |
| (1, 0, 0, 1) | (1, 0, 0, 1, 0, 0, 0) |
| (1, 0, 1, 0) | (1, 0, 1, 0, 0, 0, 0) |
| (1, 0, 1, 1) | (0, 1, 0, 0, 1, 0, 0) |
| (1, 1, 0, 0) | (1, 1, 0, 0, 0, 0, 0) |
| (1, 1, 0, 1) | (0, 0, 1, 0, 1, 0, 0) |
| (1, 1, 1, 0) | (0, 0, 0, 1, 1, 0, 0) |
| (1, 1, 1, 1) | (0, 0, 0, 0, 1, 1, 0) |

5. The device as recited in claim 3, wherein the processing circuitry is configured as an integrated circuit implemented with the aid of CMOS technology.

6. The device as recited in claim 1, wherein the processing circuitry is configured to execute at least a portion of a cryptographic method.

7. The device as recited in claim 1, wherein the algorithm provides for the same Hamming distance for the at least 50% of all of the pairwise combinations.

8. The device as recited in claim 7, wherein the same Hamming distance is 2.

9. The device as recited in claim 7, wherein the algorithm provides for a second same Hamming distance for all of the pairwise combinations other than the at least 50%.

10. The device as recited in claim 9, wherein the same Hamming distance is 2 and the second same Hamming distance is 4.

11. The device as recited in claim 1, wherein the algorithm provides for the same Hamming distance for 50% of all of the pairwise combinations and a second Hamming distance for the other 50% of all of the pairwise combinations.

12. The device as recited in claim 1, wherein the algorithm provides for the same Hamming weight.

13. The device as recited in claim 12, wherein the same Hamming weight is 2.

14. The device as recited in claim 12, wherein 100% of all of the encoded versions of the set have the same Hamming weight.

15. The device as recited in claim 12, wherein the algorithm also provides for the same Hamming distance for the at least 50% of all of the pairwise combinations.

16. The device as recited in claim 1, wherein the algorithm provides that:
 a same set of bit positions in all of the encoded versions correspond to respective sets of bits of the received data words to which the encoded versions respectively correspond;
 for each of the received data words that has a Hamming weight that is greater than a predefined value, the bits are inverted in the respective corresponding set of bit positions of the respective encoded version of the received data word; and
 for each of the received data words that has a Hamming weight that is less than or equal to the predefined value, the bits in the respective corresponding set of bit positions of the respective encoded version of the received data word are set to same values as the bits of the received data word.

17. The device as recited in claim 16, wherein the algorithm provides that:
 all of the encoded versions include at a same bit position a binary value indicating whether the set of bit positions of the encoded version is the same as or an inversion of the bits of the corresponding received data words.

18. The device as recited in claim 17, wherein the algorithm provides that:
 lengths of all of the encoded versions are the same; and
 other than (a) the set of bit positions and (b) the bit position with the value indicating whether there has been an inversion, values of all remaining bit positions of the encoded versions are set so that the Hamming weight is the same for all of the encoded versions.

19. The device as recited in claim 18, wherein the predefined value is 2.

20. The device as recited in claim 19, wherein the same Hamming weight of all of the encoded versions is 2.

21. The device as recited in claim 20, wherein the algorithm provides for conversion of all received data words with a bit length of 4 to respective encoded versions with a bit length of 7.

22. A method for operating a device for processing data to alter corresponding electronic signals to reduce susceptibility of the device to hacking of its data, the method comprising:
 receiving, by an input interface of the device, data words as input data; and
 encoding, by processing circuitry, the data words received as input data by executing an algorithm, by which execution the input data words are encoded into respective encoded versions of the input data words, wherein the algorithm is defined for application to a set of possible different data words receivable as input data at the input interface, and the algorithm defines that the encoding of the received input data words is performed according to a condition that, when the input data words that are encoded by the execution of the algorithm include all of the set of possible different data words, at least one of:
  for at least 50% of all pairwise combinations of the encoded versions of the set of all of the possible data words, Hamming distances between the respective words of the respective pairwise combinations are the same as each other; and
  a Hamming weight of at least 50% of all of the encoded versions of the set of all of the possible data words is the same is the same as each other.

23. The method as recited in claim 22, further comprising storing at least one of the encoded versions in a register.

24. The method as recited in claim 23, wherein the encoding includes adding a specified number of bits to each data word received as input data at the input interface.

25. The method as recited in claim 22, wherein the algorithm provides for assignment to the data words listed in column S2 of the following table the respective encoded data words listed in the corresponding line of column S3 of the table:

| S2 | S3 |
| --- | --- |
| (0, 0, 0, 0) | (0, 0, 0, 0, 0, 1, 1) |
| (0, 0, 0, 1) | (0, 0, 0, 1, 0, 0, 1) |
| (0, 0, 1, 0) | (0, 0, 1, 0, 0, 0, 1) |
| (0, 0, 1, 1) | (0, 0, 1, 1, 0, 0, 0) |

-continued

| S2 | S3 |
|---|---|
| (0, 1, 0, 0) | (0, 1, 0, 0, 0, 0, 1) |
| (0, 1, 0, 1) | (0, 1, 0, 1, 0, 0, 0) |
| (0, 1, 1, 0) | (0, 1, 1, 0, 0, 0, 0) |
| (0, 1, 1, 1) | (1, 0, 0, 0, 1, 0, 0) |
| (1, 0, 0, 0) | (1, 0, 0, 0, 0, 0, 1) |
| (1, 0, 0, 1) | (1, 0, 0, 1, 0, 0, 0) |
| (1, 0, 1, 0) | (1, 0, 1, 0, 0, 0, 0) |
| (1, 0, 1, 1) | (0, 1, 0, 0, 1, 0, 0) |
| (1, 1, 0, 0) | (1, 1, 0, 0, 0, 0, 0) |
| (1, 1, 0, 1) | (0, 0, 1, 0, 1, 0, 0) |
| (1, 1, 1, 0) | (0, 0, 0, 1, 1, 0, 0) |
| (1, 1, 1, 1) | (0, 0, 0, 0, 1, 1, 0) |

26. The method as recited in claim 22, further comprising applying a cryptographic method to the encoded versions.

27. The method as recited in claim 22, wherein the algorithm provides for the same Hamming distance for the at least 50% of all of the pairwise combinations.

28. The method as recited in claim 27, wherein the same Hamming distance is 2.

29. The method as recited in claim 27, wherein the algorithm provides for a second same Hamming distance for all of the pairwise combinations other than the at least 50%.

30. The method as recited in claim 29, wherein the same Hamming distance is 2 and the second same Hamming distance is 4.

31. The method as recited in claim 22, wherein the algorithm provides for the same Hamming distance for 50% of all of the pairwise combinations and a second Hamming distance for the other 50% of all of the pairwise combinations.

32. The method as recited in claim 22, wherein the algorithm provides for the same Hamming weight.

33. The method as recited in claim 32, wherein the same Hamming weight is 2.

34. The method as recited in claim 32, wherein 100% of all of the encoded versions of the set have the same Hamming weight.

35. The method as recited in claim 32, wherein the algorithm also provides for the same Hamming distance for the at least 50% of all of the pairwise combinations.

* * * * *